United States Patent [19]

MacDonald et al.

[11] Patent Number: 5,105,469
[45] Date of Patent: Apr. 14, 1992

[54] CONTROL DATA ARRAY GENERATION APPARATUS AND METHOD

[75] Inventors: Lindsay W. MacDonald, Bedfordshire; Richard A. Kirk, Hertfordshire, both of England

[73] Assignee: Crosfield Electronics Limited, Herts, England

[21] Appl. No.: 650,492

[22] Filed: Feb. 5, 1991

[30] Foreign Application Priority Data

Feb. 5, 1990 [GB] United Kingdom ................. 9002477

[51] Int. Cl.⁵ ............................................. G06K 9/36
[52] U.S. Cl. .......................................... 382/17; 382/18; 358/80
[58] Field of Search ............... 382/17, 18, 33; 358/80; 364/521

[56] References Cited

U.S. PATENT DOCUMENTS

| | | | |
|---|---|---|---|
| 4,402,007 | 8/1983 | Yamada | 358/80 |
| 4,488,245 | 12/1984 | Dalke et al. | 358/80 |
| 4,642,683 | 2/1987 | Alkofer | 358/80 |
| 4,654,720 | 3/1987 | Tozawa | 358/80 |
| 4,718,089 | 1/1988 | Hayashi et al. | 382/17 |
| 4,878,178 | 10/1989 | Takakura et al. | 364/521 |

FOREIGN PATENT DOCUMENTS

2208460 3/1989 United Kingdom .

*Primary Examiner*—Leo H. Boudreau
*Assistant Examiner*—David Fox
*Attorney, Agent, or Firm*—Sughrue, Mion, Zinn, Macpeak & Seas

[57] ABSTRACT

Apparatus for generating an array of control data, the array having a number of pixels each of which corresponds to a respective pixel in an image, the apparatus comprising a first store (100) for storing the image data; a second store (17) for storing the control data; and a processor which, for each control data array pixel generates and stores in the second store (17) a control value in accordance with a predetermined algorithm which defines the control value as a function of the corresponding image pixel color components and the corresponding color component(s) of the target colors, wherein the generated control values can be ordered on a scale of at least three value classes.

9 Claims, 6 Drawing Sheets

CONTROL DATA ARRAY GENERATION APPARATUS AND METHOD

FIELD OF THE INVENTION

The invention relates to methods and apparatus for generating an array of control data, the array having a number of pixels each of which corresponds to a respective pixel in an image.

DESCRIPTION OF THE PRIOR ART

Such control data arrays are commonly termed masks and find wide use in image processing systems. For example, in page layout they may define the areas and positions occupied by the features in the page, as well as the area of each image to be included. In image retouching, or colour correction they may define which pixels of an image are to be modified. In electronic paint systems they may represent the density of the spray from an air brush. In design systems they may indicate the density gradation of a vignette pattern or shadow region.

Masks can be conveniently classified into two types: hard and soft. Hard masks have 1 bit per pixel. Their purpose is to separate the pixels of an image into two classes, one class to be processed in a certain way and the other to be processed in a different way. Soft masks, or "mattes", have multiple (usually 8) bits per pixel. They specify for each pixel a density value, which may represent the transparency (or opacity) of the pixel for a mixing operation. Into the latter category also fall soft-edged masks, having a hard interior but a graduated edge. These are typically used for "anti-aliased" compositing of curved shapes in computer graphics applications.

The use of masks simplifies both the operation and the software design of a product. For the operator the advantages are that fewer items of information need to be kept in mind at any one time. He can concentrate first on making the mask, using a variety of electronic "tools" as appropriate, then on using it to control the scope of some operation, such as image retouching. Similarly the software designer can create one set of routines for making and manipulating masks, and another for the transforms on images or pages.

The existence of a separate mask facilitates the design of hardware for the combination of two or more images for display on a video monitor. In the case of a hard mask, binary pixel values read from the mask store can be used to control a video-rate switch between the corresponding pixels of source images read synchronously from separate image stores. In the case of a soft mask, 8-bit pixel mask pixel values read from the mask store can be used to control a video-rate mixer that adds proportions of each of the source image pixels. Such arrangements are disclosed in EP-A-0089174 (equivalent U.S. Pat. No. 4,617,592) and EP-A-0344976 (equivalent U.S. Pat. No. 4,954,912).

Masks can be generated conventionally in a number of ways. In the case of a hard mask, the operator might outline and fill an area of an image which is to be one class resulting in all the corresponding control pixels being coded with a binary "1" while the remainder are coded with a binary "0". In another method, a colour selective technique can be used to define a hard mask. In this technique each pixel of the source image is checked to determine whether the individual colour values (such as red, green, blue) fall into specified ranges. The 25 true/false results are combined logically to give a final true or false (1 or 0) value for the corresponding mask pixel. The mask can then be displayed superimposed over the image.

As an example, the algorithm used in the Crosfield Studio 800 system allows up to four classes of source colour to be defined. Each class consists of a range of values for one or more of the CMYK (cyan, magenta, yellow, black) inks (defaulting to 0-100% if not defined). A pixel of the source image is considered to be a member of a class if all its colour components fall within the specified CMYK ranges (AND = logical intersection). A mask pixel is set if the corresponding image pixel lies in one or more of the classes (OR = logical union), i.e. if

|    | (C1 AND M1 AND Y1 AND K1)          |
|----|-------------------------------------|
| OR | (C2 AND M2 AND Y2 AND K2)          |
| OR | (C3 AND M3 AND Y3 AND K3)          |
| OR | (C4 AND M4 AND Y4 AND K4) is TRUE. |

The ranges C1, M1, etc are any arbitrary sets of values in each colour. Normally each range would represent one contiguous set of values, such as $40 \leq C \leq 60$, but non-contiguous sets are also allowed.

Although the colour selective masking method described above gives usable colour selective masks, it suffers from several limitations:

1. The limits define a cuboid volume in colour space which is not always as selective as necessary;
2. It gives only a true/false selection, resulting in a binary or hard mask;
3. It does not perform well on translucent or reflective subjects where the background and foreground colours are mixed;
4. The masks are affected by noise, resulting in unwanted "pin-holes" and ragged edges; and
5. It can be slow in implementation, resulting in frustrating delays for an operation that should ideally be interactive.

SUMMARY OF THE INVENTION

In accordance with one aspect of the present invention, a method of generating an array of control data, the array having a number of pixels each of which corresponds to a respective pixel in an image, comprises selecting at least one target colour, and then for each control data array pixel generating a control value in accordance with a predetermined algorithm which defines the control value as a function of the corresponding image pixel colour components and the corresponding colour component(s) of the target colour(s), wherein the generated control values can be ordered on a scale of at least three value classes.

In accordance with a second aspect of the present invention, apparatus for generating an array of control data, the array having a number of pixels each of which corresponds to a respective pixel in an image, comprises a first store for storing the image data; a second store for storing the control data; and processing means which, for each control data array pixel generates and stores in the second store a control value in accordance with a predetermined algorithm which defines the control value as a function of the corresponding image pixel colour components and the corresponding colour component(s) of the target colours, wherein the generated control values can be ordered on a scale of at least three value classes.

This invention improves upon the previous colour selective masking technique by obtaining a measure of the proximity of the colour coordinates of an image pixel to some target point in colour space, rather than simply making a binary decision about each colour component independently.

In one example, the predetermined algorithm can define the control value as representing a function of the Euclidean distance in colour space between the image pixel colour and the target colour. For example, the predetermined algorithm may have the form:

$$D = \sqrt{(a(C-C_T)^2 + b(M-M_T)^2 + c(Y-Y_T)^2 + d(K-K_T)^2)} \quad (1)$$

where
$C_T$, $M_T$, $Y_T$, and $K_T$ are the colour component values of the target colour,
C, M, Y, K, are the colour component values of the image pixel, and
a, b, c, and d are weighting coefficients.

Although equation 1 defines the control value in terms of all four colour component values, this is not essential and only one or some of the colour component values could be used. It should also be understood that any other suitable colour space could be used in place of CMYK, which is customary for printing applications. For example, in the frame stores for video display monitors pixels would typically be represented by red, green and blue colour components. In broadcast television, colour is encoded differently for transmission, such as the YIQ signals in the NTSC system. In yet other applications, such as paint and dye formulation, the CIE system is commonly used with LAB or LUV coordinates. The present invention applies without loss of generality to all of these, and other, colour spaces.

For some purposes a simple distance metric, as described above, is not sufficient. In order to generate a matte proportional to the "blueness" of the image, for example, a 2-D Gaussian distribution, centred on the target colour of blue might be more appropriate. This could be formulated as the product of two 1-D Gaussians:

$$D = f(C,M) = a \exp[-b(C-C_T)^2] \exp[c(M-M_T)^2] \quad (2)$$

where
a is a normalising factor and
b, c govern the widths of the distributions for C,M.

Such functions can easily be extended to three or more colour coordinates as necessary. They are set out here in two colours only to facilitate visualisation. Instead of a Gaussian, an inverse power law might prove to be more useful having the general form:

$$D = g(C,M) = \frac{a}{[C-C_T]^b + 1} \cdot \frac{1}{[M-M_T]^c + 1} \quad (3)$$

One use for such functions could be in image retouching, for example to change all pixels of the target colour to another colour (e.g. blue to green) and to change pixels of nearby colours by a proportional amount. The density matte value a at each pixel, normalised to the range [0-1], could then be used to control the blending of the image with the new colour, for example by linear combination of each colour component:

$$\text{Modified pixel} = (1-a) \times \text{Old pixel} + a \times \text{New colour} \quad (4)$$

A further refinement of the technique can be made operator specifies not only the object (foreground) colour but also the background colour. The matte is then calculated in such a way that it takes high values for colours near the foreground target, low values for colours near the background target, and a medium value for all other colours. For example, using the Gaussian functions given in equation (2), the composite function could be:

$$f^*(C,M) = f_F(C,M) - f_B(C,M) + f_O \quad (5)$$

where
$f_F$ is the foreground function
$F_B$ is the background function and
$f_O$ is a constant The of this function is to have a maximum value at the foreground target colour, a minimum value at the background target colour and intermediate values elsewhere.

In some cases the function may include a thresholding step in which an intermediate control value is compared with a threshold to generate a final, binary control value or the final value may be generated from an intermediate value and tone curves leading to a soft mask.

The target colour or colours themselves can be selected in a conventional manner by the operator simply specifying the colour component values for example by numerical entry via a keyboard. Alternatively, the operator can select a colour already existing in the image or mixed on a palette or can define the target colour as a range of related colours for example by using a pointing device such as a hand-held mouse to position a graphical cursor on the display screen over the desired colour(s). A preferred method for defining the target colour comprises specifying an area of interest within the image; constructing a histogram of pixel values within the specified area of interest and determining from the histogram the median and given percentile points for each colour component, and then providing the target colour weighting and spread coefficients.

In some circumstances, it has been found that selecting pixels with colours close to the target pixels can have surprising results. For example, an object which may appear generally red may actually contain a number of tints from blacks in deep shadows, intense reds where the object reflects internally, pinks and whites for highlights, and so on. These tints are not necessarily the nearest to the target colour in the first colour space that is available, but span a range extending from the pure colour towards both white and black.

We therefore propose an additional, preliminary, step in which the initial colour components defining the image in a first colour space are transformed into a second or subsequent colour space from which the control values can be determined. For example, in one case of particular interest the first colour space is transformed so that the colour components defining the central locus of the target colour range lie along the major axis of the second colour space, with the other two axes being perpendicular to the first axis and to each other. From this second colour space it is easy to derive the control values corresponding to each pixel of the image.

The processing means may be implemented in a suitably programmed computer or in a hardware form. In the latter case, for example, in order to implement the algorithm defining equation (1) above, four look-up tables are provided each of which defines a function of the form $$X_i = (i - Y_T)^2/N^2$$

where $Y_T$ is a target colour component value and N is a scaling coefficient chosen so that the required amount of sensitivity for that colour component is achieved, outputs from the look-up tables being fed to adders which generate the sum of the outputs, the output from the adders being fed to a fifth look-up table which reduces the accuracy back to eight bits. This look-up table is commonly loaded with a linear or square root function.

Other configuruations are possible as will be described below.

BRIEF DESCRIPTION OF THE DRAWINGS

Some examples of methods and apparatus according to the invention will now be described with reference to the accompanying drawings, in which.

DETAILED DESCRIPTION OF THE EMBODIMENTS

Figure 1:
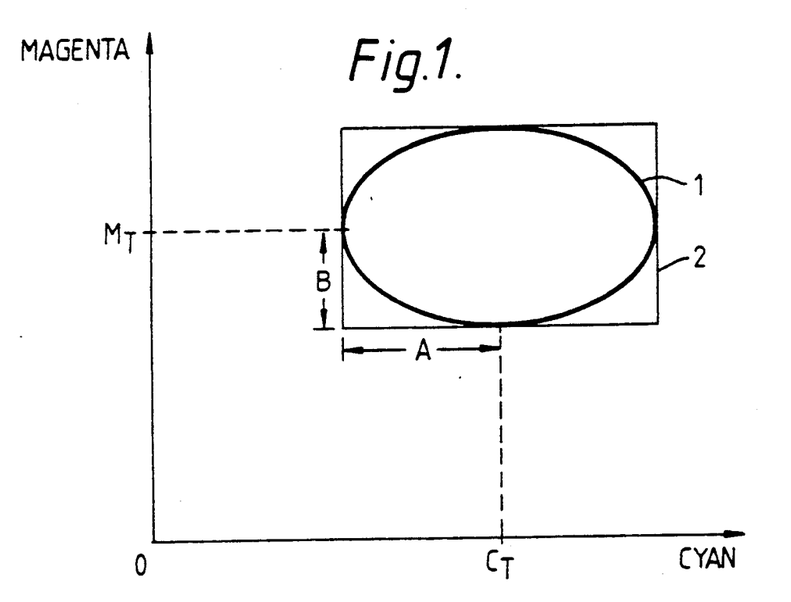
FIG. 1 illustrates graphically the relationship between a mask generated using a conventional colour selective technique and a mask generated by a method according to the invention.

FIG. 1 illustrates a distance function in colour space, reduced to two-dimensions for simplicity, where the target colour has components $C_T$ and $M_T$ and an elliptical contour 1 results from calculating the distance function:

$$D = \sqrt{(a(C-C_T)^2 + b(M-M_T)^2)} \quad (6)$$

The rectangular contour 2 which is shown illustrates, for comparison purposes, the effect of a conventional thresholding technique which simply makes a true/false decision depending upon whether or not C and M are within a range of values spanning the target colour. In this conventional case, any combination of C and M within the rectangle result in a mask value 1, anywhere outside the rectangle result in a mask value 0.

In this example of the invention, the region in colour space can be restricted to an ellipse so that points that were included in the corners of the rectangle will now be excluded. The reduction in area is to fAB for the ellipse from 4AB for the rectangle, a constant ratio of f/4=0.79. In three dimensions the volume ratio of ellipsoid to cuboid is f/6=0.52. Thus the selectivity of the ellipsoid is almost double that of the cuboid.

Figure 2:
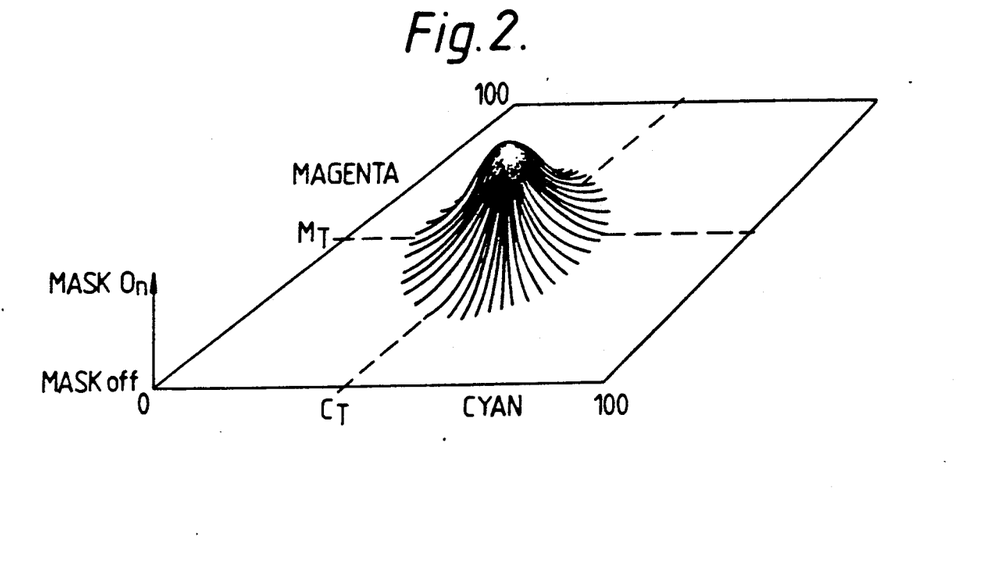
FIG. 2 illustrates the form of a weighted density function.

FIG. 2 illustrates the form of the function defined by equation (2) above with the Z-axis representing the magnitude of the function.

Figure 3:
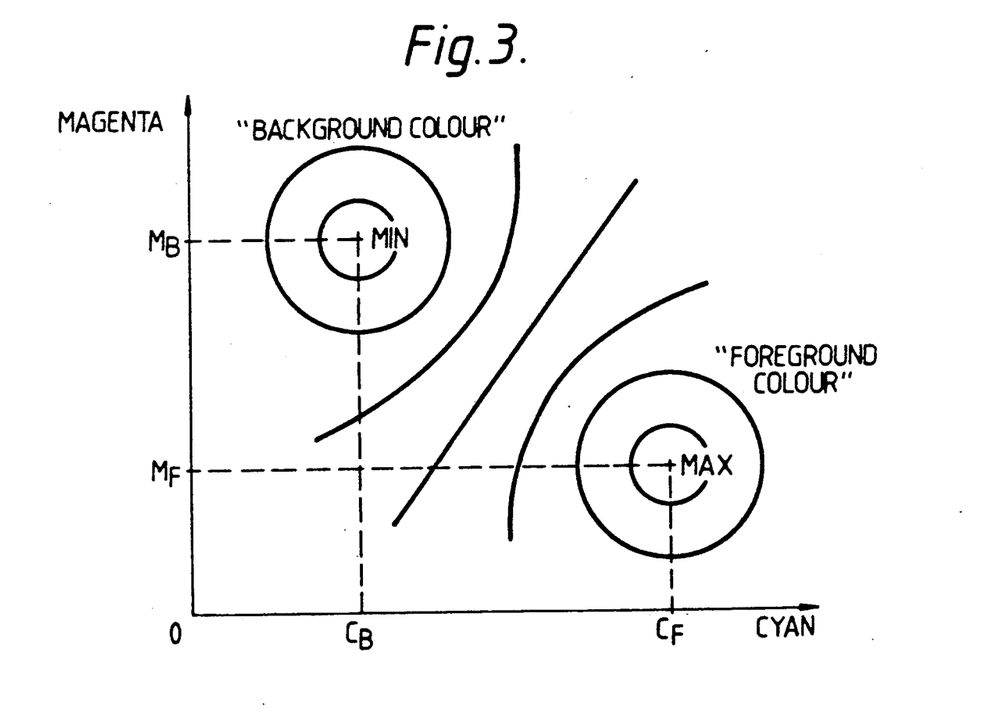
FIG. 3 illustrates the form of a function which discriminates between foreground and background colour domains.

FIG. 3 illustrates an example of the function defined in equation (5) above in two dimensions.

Figure 4:
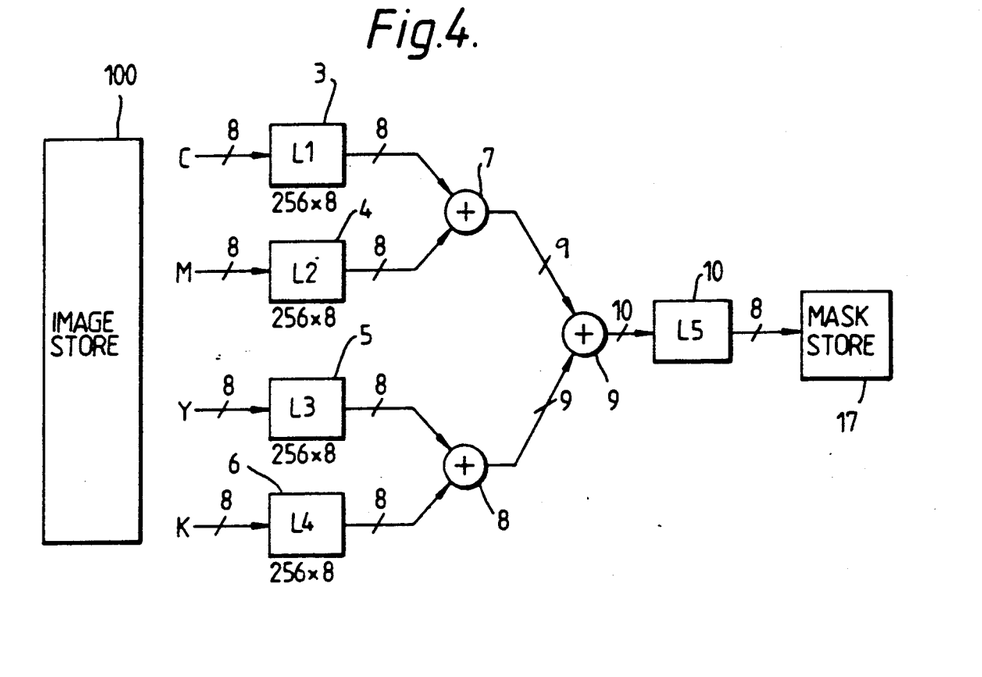
FIG. 4 illustrates one example of a colour selective mask generation circuit.

FIG. 4 illustrates a first example of a hardware arrangement for implementing the method. In this example, respective colour components C, M, Y and K of pixel data in the image store 100 are fed to four look-up tables 3-6 (L1-L4), each having 256 addressable entries with an 8-bit data value stored at each entry. The outputs from the look-up tables 3, 4 are fed to an adder 7 while the outputs from the look-up tables 5, 6 are fed to an adder 8. The 9-bit outputs from the adders 7, 8 are fed to an adder 9 whose 10-bit output is used to address a look-up table 10 having 1024 entries, each containing an 8-bit mask value, which is stored in the corresponding pixel location in mask store 17.

In the simplest case, the look-up tables could be loaded as follows:

| | | |
|---|---|---|
| L1 | $X_i = (i - C_T)^2/N^2$ | $i = (0 \ldots 255)$ |
| L2 | $X_i = (i - M_T)^2/N^2$ | $i = (0 \ldots 255)$ |
| L3 | $X_i = (i - Y_T)^2/N^2$ | $i = (0 \ldots 255)$ |
| L4 | $X_i = (i - K_T)^2/N^2$ | $i = (0 \ldots 255)$ |
| L5 | $X_i = 8 \sqrt{i}$ | $i = (0 \ldots 1023)$ |

The scaling coefficient N is chosen so that the required amount of sensitivity is achieved. Out-of-range values are limited to 255. For example, N=1 concentrates attention on the narrow range $C_T \pm 16$ whereas N=8 broadens the useful range to $C_T \pm 128$. Differing values of N for each table give the ellipsoidal regions, i.e. differing sensitivities for the different colour primaries.

The multiplicative functions given by equations (2) and (3) can also be implemented by the circuit of FIG. 4 by loading logarithms of the functions in the input tables and an antilogarithm in the output table;

| | |
|---|---|
| L1-L4 | $X_i = a \cdot \log(f_N(i))$ |
| L5 | $X_i = \exp(i/a)$ |

Figure 5:
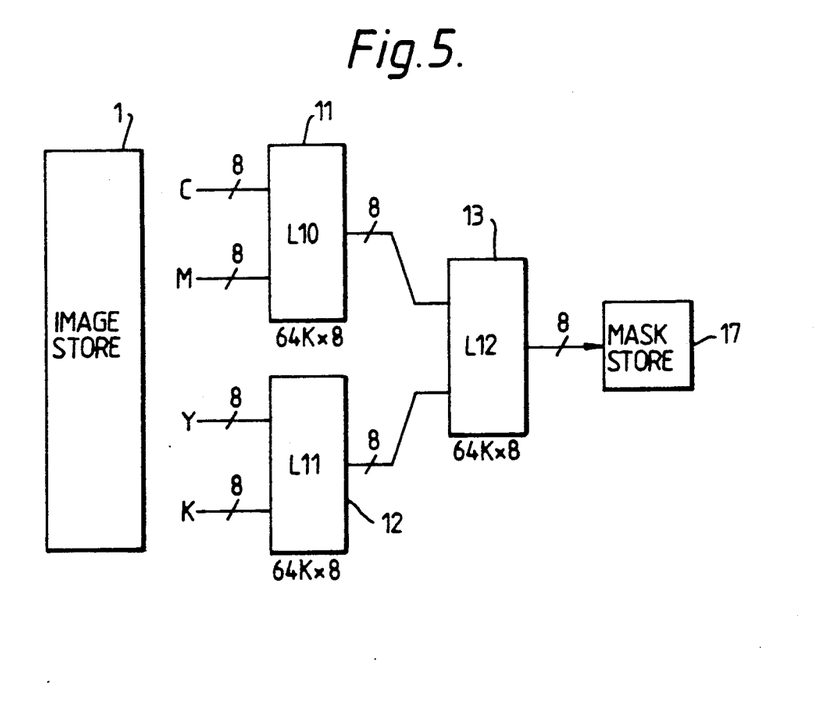
FIG. 5 illustrates a second example of a colour selective mask generation circuit.

FIG. 5 illustrates an alternative circuit, which is functionally almost identical to the circuit in FIG. 4. In this case, the colour component data C, M and Y, K are fed in pairs from the image store 1 to look-up tables 11, 12 (L10,L11) each of which has dimensions 64K × 8. The outputs from the look-up tables 11, 12 are fed to a further look-up table 13 (L12) to generate the final 8 bit value for storage in the mask store 17. The advantage of this arrangement is that the adders are omitted allowing more complex two-dimensional functions to be represented (e.g. ellipses with rotated axes).

Figure 6A:
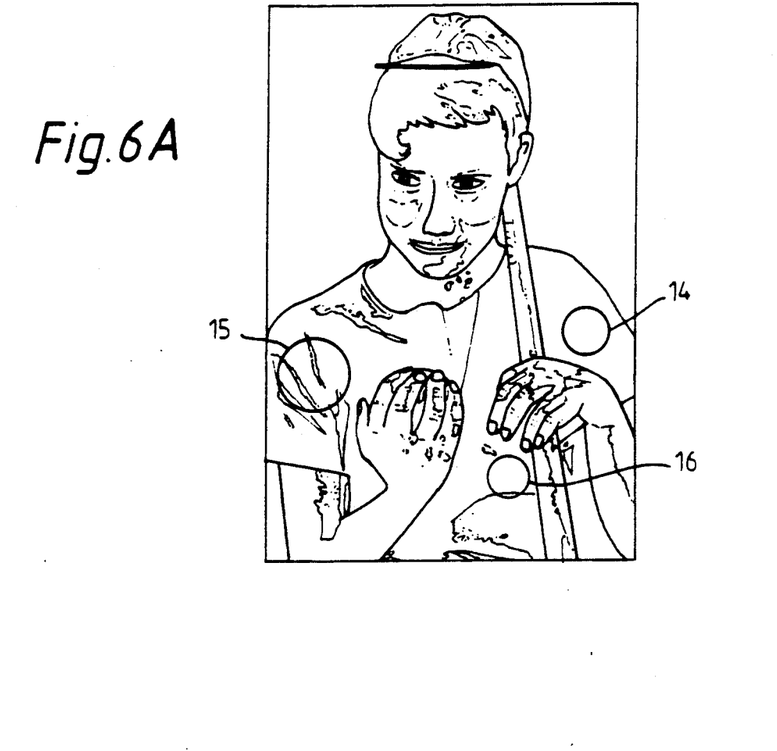
FIGS. 6A and 6B illustrate an image and a colour component histogram respectively during the generation of a target colour.

In operation, the user will first define the target colour. This may involve, for example, displaying the image (FIG. 6A) on a monitor and then defining regions in the image having the colour which it is desired to mask. In this example, a colour-selective mask for the boy's T-shirt is required so that the operator might circle two regions 14, 15 using a cursor or the like and then a further region 16 corresponding to an area which is not to be masked.

Figure 6B:
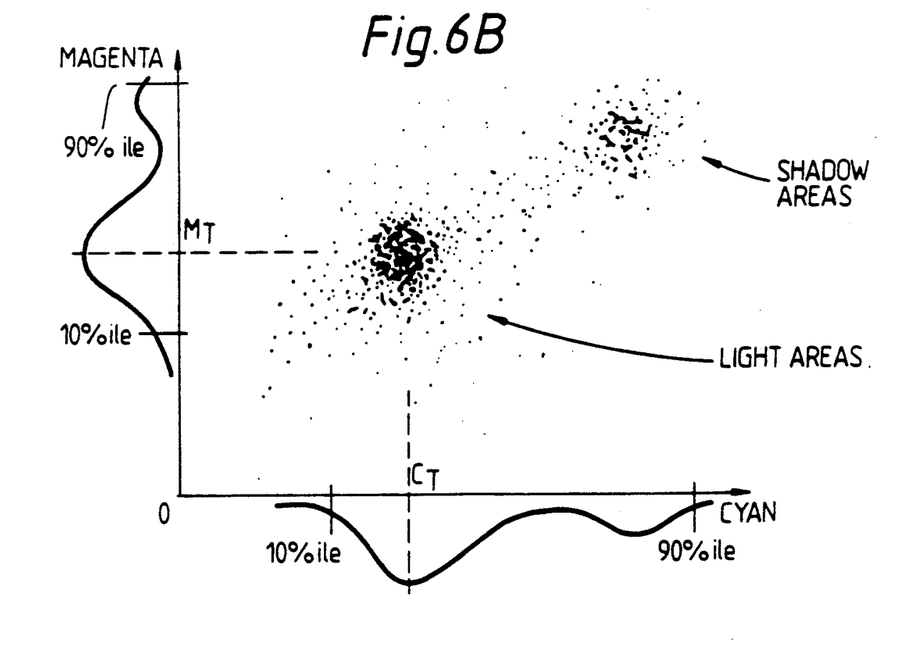

The computer then "plots" all the pixels within the contours 14–16 in colour space and constructs a histogram for the distribution within each colour coordinate as illustrated in FIG. 6B. This histogram is then analysed to determine the median and given percentile points (in this case 10% and 90%) in each colour channel as shown in FIG. 6B. The mean is used to define the colour component values of the target colour as shown. For example, the spread coefficients are derived from the statistical spread, or scatter, of the sample points as indicated for example by the 10%ile and 90%ile points of the histogram. They are then used to determine the length of the semi-axes of the ellipse in FIG. 1, i.e., the dimensions of the region in colour space that contains the majority of the desired colours. Equation (1) could be expressed as $$D^2 = \frac{(C - C_T)^2}{x^2} + \frac{(M - M_T)^2}{y^2} + \frac{(Y - Y_T)^2}{z^2} \qquad (7)$$

where
$x = C_{90} - C_{10}$
$y = M_{90} - C_{10}$
$z = Y_{90} - Y_{10}$

The operator then instructs the computer to perform the appropriate algorithm as defined by the look-up tables of either the FIG. 4 or FIG. 5 circuit. The resultant mask is then stored in a store 17. To derive a hard (1-bit) mask for separating foreground and background regions of an image, the operator could subsequently apply a simple threshold operation to the 8-bit data in mask store 17, displaying pixels of the mask where the value exceeds the threshold level by a distinctive colour such as bright green. Interactive adjustment of the threshold level would allow the operator to use judgement as to the optimum setting.

Figure 7A:
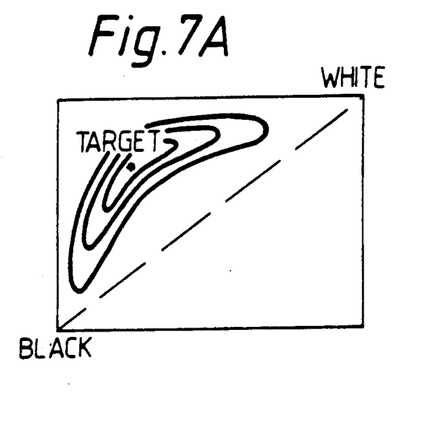
FIGS. 7A-7E illustrate different stages in a method for preparing colour component data; and, FIG. 8 is a schematic block diagram of apparatus for performing the steps illustrated in FIG. 7.

As has been mentioned above, in some cases, it may be desirable to transform the colour components from one colour space to another before generating the colour-selective mask. The reason for this can be seen in FIG. 7A where the probability contours of the range of colours in CMY colour space that can be seen in an object of a certain colour under different lighting conditions are shown in two dimensions. It can be seen that the central locus of these contours comprises a curve starting in the black corner, passing through the target colour, and then ending at the white point. In the invention, we wish to plot the three-dimensional distribution of all colours within a certain degree of fit from the target colour, for example by sampling pixels from one or more areas of the image. It would be expected that this Figure will extend in the light/dark directions due to the large variety of lighting conditions, but will be quite confined in the perpendicular (hue) directions since hue is relatively unchanged with variations in lighting conditions.

Ideally, one should transform the colour components to a second colour spaced that is based upon the perceptual colour attributes of lightness, colourfulness and hue (LCH), such as defined in the 1976 CIELUV Uniform Colour Space. Indeed, for applications where a high standard of colour fidelity must be maintained, such as image retouching and colour matching for print reproduction, use of such a colour space is essential. For making a mask, however, the quality criteria are less stringent and certain approximations can successfully be made.

Figure 7B:
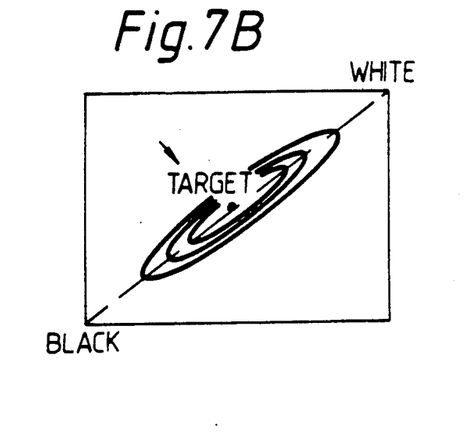
Figure 8:
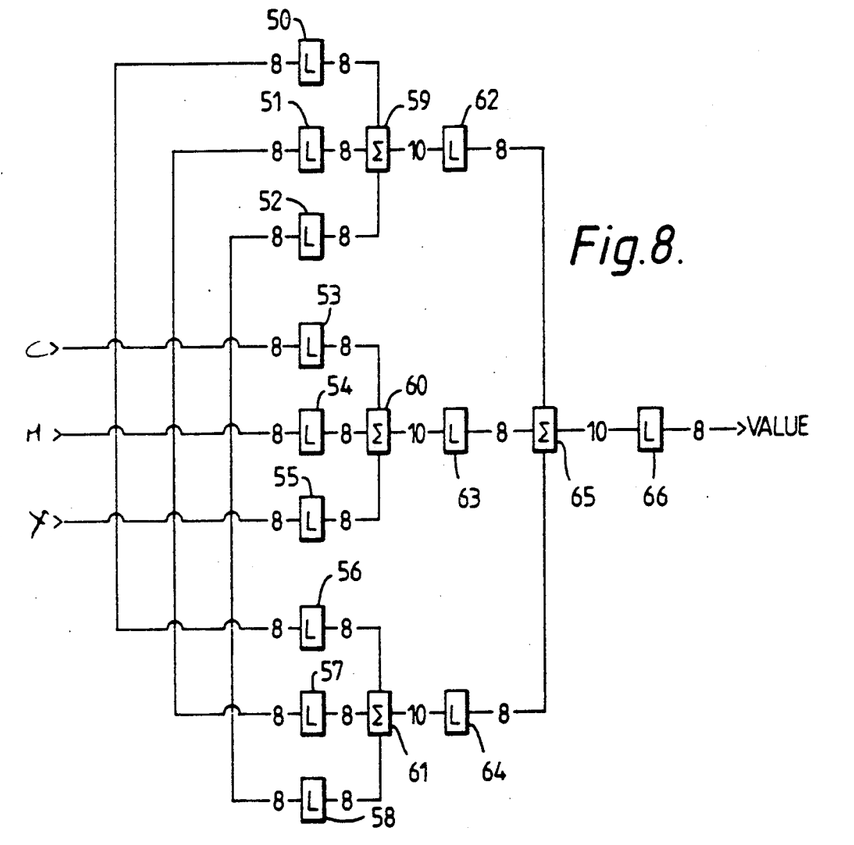

We have simplified the transformation by observing that the major diagonal in the CMY "colour cube" runs from black to white and is a reasonable approximation to the true achromatic lightness axis. In order therefore to improve the colour-selective masking technique, in an initial step the amounts by which the colour component values (CMY) defining the target colour must be modified to move those values so as to lie on the major diagonal in the colour cube (FIG. 7B) are determined and then these weights are stored in an initial section of a set of nine look-up tables 50-58 (FIG. 8). The initial CMY values are thus applied to respective sets of three of the look-up tables 50-58 which in the first section will convert these colour components to new colour values C', M', Y', to define a set of elliptical contours aligned to the diagonal as shown in FIG. 7B. The target point is now on the diagonal of the colour cube while the black and white points stay unchanged.

The actual transformation is conveniently performed by scaling by linear amounts above and below the target colour, i.e. by fitting straight lines from the target colour to the white and black points respectively. This introduces a geometric discontinuity at the target point, although in most instances this causes no visible discontinuity in the final mask. This discontinuity could be eliminated by fitting a higher order curve, such as a parabola, through the target to the white and black points.

Figure 7C:
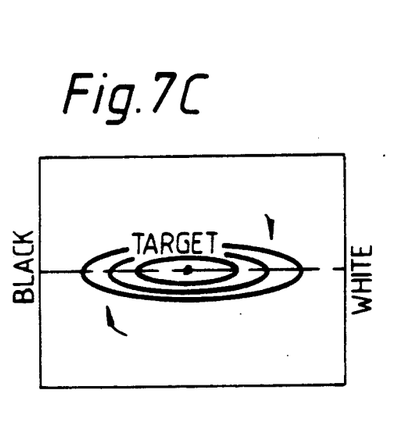

In the next stage the axes of the colour cube are rotated so that the first new axis (X') lies along the diagonal of the colour cube and the other two (Y', Z') are perpendicular to it. This rotation results in the image being defined by new colour components X', Y', Z' with contours as shown in FIG. 7C. The rotation is performed by a second section of each of the LUTs 50-58 and a corresponding set of three summation circuits 59-61. Typically, each LUT 50-58 will also add an offset.

Although a complex transform, such as defined by the 1976 CIELUV formulae, would give the optimum results, in practice a simple linear combination of the CMY primaries gives acceptable results:

$$\left.\begin{array}{l} X' = (C + M + Y)/3 \\ Y' = (M - C)/2 + \text{offset} \\ Z' = (2Y - C - M)/4 + \text{offset} \end{array}\right\} \qquad (8)$$

The X' axis approximates the lightness dimension in a perceptual colour space, and the Y', Z' axes approximate the opponent red-green and yellow-blue dimensions respectively.

Figure 7D:
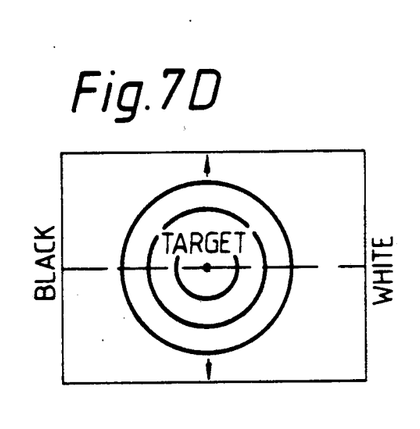
Figure 7E:
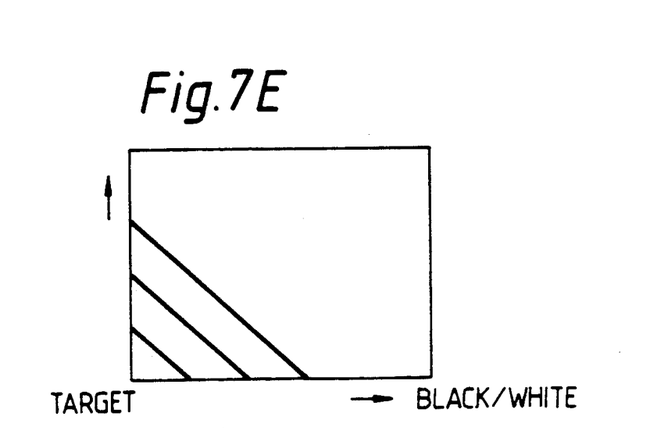

In the next stage, the new axes are scaled by respective, different amounts, an origin shift is performed and the resulting component values are squared. This results in a series of circular contours (FIG. 7D) and is performed by the look-up tables 62-64. The output values of these look-up tables 62-64 are reduced to eight bits and then fed to a summation circuit 65 and thence to an output look-up table 66 which may be loaded with a square-root or other function to derive the 8-bit mask value, in similar fashion to LUT 10 of FIG. 4.

Although the above description of the transformation implemented by FIG. 8 has assumed the first colour space to represent the printing ink colours CMY, other colour spaces could equally well be catered for by minor variants of the transformation. In particular, the RGB colour spaces used for phosphor display monitors or emulsion film scanners can be handled because the RGB coordinates are complementary to CMY and define the same "colour cube" as described above.

We claim:

1. A method of generating an array of control data, the array having a number of pixels each of which corresponds to a respective pixel in an image, the method comprising selecting at least one target colour, and then for each control data array pixel generating a control value in accordance with a predetermined algorithm which defines the control value as a function of the corresponding image pixel colour components and the corresponding colour component(s) of the target colour(s), wherein the generated control values can be ordered on a scale of at least three value classes, wherein said step of selecting the target colour comprises:

specifying an area of interest within the image;

constructing a histogram of pixel values within the specified area of interest and determining from the histogram the median and given percentile points for each colour component; and providing the target colour weighting and spread coefficients in accordance with said constructing step.

2. A method according to claim 1, wherein the predetermined algorithm defines said control value as representing a function of the Euclidean distance in colour space between the image pixel colour and the target colour.

3. A method according to claim 2, wherein said predetermined algorithm has the form $$D = \sqrt{(a(C-C_T)^2 + b(M-M_T)^2 + c(Y-Y_T)^2 + d(K-K_T)^2)} \quad (1)$$

where $C_T, M_T, Y_T,$ and $K_T$ are the colour component values of the target colour, C, M, Y, K, are the colour component values of the image pixel, and a, b, c, and d are weighting coefficients.

4. A method according to claim 1, wherein said predetermined algorithm has the form $$D = f(C,M) = a \exp[-b(C-C_T)^2] \exp[-c(M-M_T)^2] \quad (2)$$

where a is a normalising factor and b, c govern the widths of the distributions for C,M.

5. A method according to claim 1, wherein said predetermined algorithm has the form $$f_*(C,M) = f_F(C,M) - f_B(C,M) + f_O \quad (5)$$

where $f_F$ is a foreground function $f_B$ is a background function, and, $f_O$ is a constant.

6. A method according to claim 1, further comprising a preliminary step in which the initial colour components defining the image in a first colour space are transformed into a second colour space from which the control values can be determined.

7. A method according to claim 6 wherein said first colour space is transformed so that the colour components defining the central locus of the target colour range lie along the major axis of the second colour space, with the other two axes being perpendicular to the first axis and to each other.

8. Apparatus for generating an array of control data, the array having a number of pixels each of which corresponds to a respective pixel in an image, the apparatus comprising a first store for storing the image data; a second store for storing the control data; and processing means which, for each control data array pixel generates and stores in the second store a control value in accordance with a predetermined algorithm which defines the control value as a function of the corresponding image pixel colour components and the corresponding colour component(s) of at least one preselected target colour, wherein the generated control values can be ordered on a scale of at least three value classes, wherein the processing means comprises 4 look-up tables, each of which defines a function of the form $$X_i = (i - Y_T)^2 / N^2$$

where $Y_T$ is a target colour component value and N is a scaling coefficient chosen so that the required amount of sensitivity for that colour component is achieved, outputs from the look-up tables being fed to adders which generate the sum of the outputs, the output from the adders being fed to a fifth look-up table which reduces the accuracy back to eight bits.

9. Apparatus according to claim 8, wherein the processing means is adapted to carry out the steps of selecting at least one target colour, and then for each control data array pixel generating a control value in accordance with a predetermined algorithm which defines the control value as a function of the corresponding image pixel colour components and the corresponding colour component(s) of the target colour(s), wherein the generated control values can be ordered on a scale of at least three value classes.

* * * * *